United States Patent [19]

Duran et al.

[11] Patent Number: 4,815,908
[45] Date of Patent: * Mar. 28, 1989

[54] CAPTIVE PANEL FASTENER ASSEMBLY

[75] Inventors: John A. Duran, Glendora; Simon Basmadzhyan, Glendale, both of Calif.

[73] Assignee: Avibank Mfg., Inc., Burbank, Calif.

[ * ] Notice: The portion of the term of this patent subsequent to Apr. 5, 2005 has been disclaimed.

[21] Appl. No.: 919,200

[22] Filed: Oct. 14, 1986

[51] Int. Cl.$^4$ .............................................. F16B 21/18
[52] U.S. Cl. .................................... 411/353; 411/103; 411/999
[58] Field of Search ............... 411/103, 105, 106, 338, 411/353, 403, 432, 999, 352

[56] References Cited

U.S. PATENT DOCUMENTS

| | | | |
|---|---|---|---|
| 3,508,775 | 4/1970 | Simonson | 411/999 |
| 3,765,465 | 10/1973 | Gulistan | 411/353 |
| 4,125,140 | 11/1978 | Basile | 411/999 |
| 4,174,008 | 11/1979 | Preziosi | 411/999 |
| 4,285,380 | 8/1981 | Gulistan | 411/103 |
| 4,324,517 | 4/1982 | Dey | 411/353 |
| 4,432,680 | 2/1984 | Molina | 411/352 |
| 4,464,090 | 8/1984 | Duran | 411/353 |

*Primary Examiner*—Neill Wilson
*Attorney, Agent, or Firm*—Poms, Smith, Lande & Rose

[57] ABSTRACT

A captive panel fastener assembly for joining a panel to a sub-structure. The fastener assembly includes a bolt, a grommet assembly which is attached to the panel and a receptacle assembly which is attached to the sub-structure. The bolt passes through the grommet assembly and engages the receptacle assembly thereby joining the panel and the sub-structure. The bolt includes an enlarged head and a threaded shank with a terminal nose and a groove adjacent the nose. A retaining ring is trapped in a cavity in the grommet assembly. The cavity of the grommet assembly is an annular cavity defined by the inner annular peripheral vertical wall of the grommet assembly, and has an inwardly extending horizontal bottom flange. The upper wall may be formed by an upwardly and inwardly extending upper flange. The bolt may be disengaged from the receptacle assembly and retracted away from the panel but retained thereto when the panel is disengaged from the sub-structure. The configuration of the cavity allows the retaining ring to bottom against the upper flange thereof when the bolt is pulled to the outward position causing the retaining ring to bottom out against the groove of the bolt. Thus, the more pull placed on the bolt, the tighter the retaining ring becomes on the bolt groove thereby preventing the bolt from coming out of the grommet assembly.

26 Claims, 4 Drawing Sheets

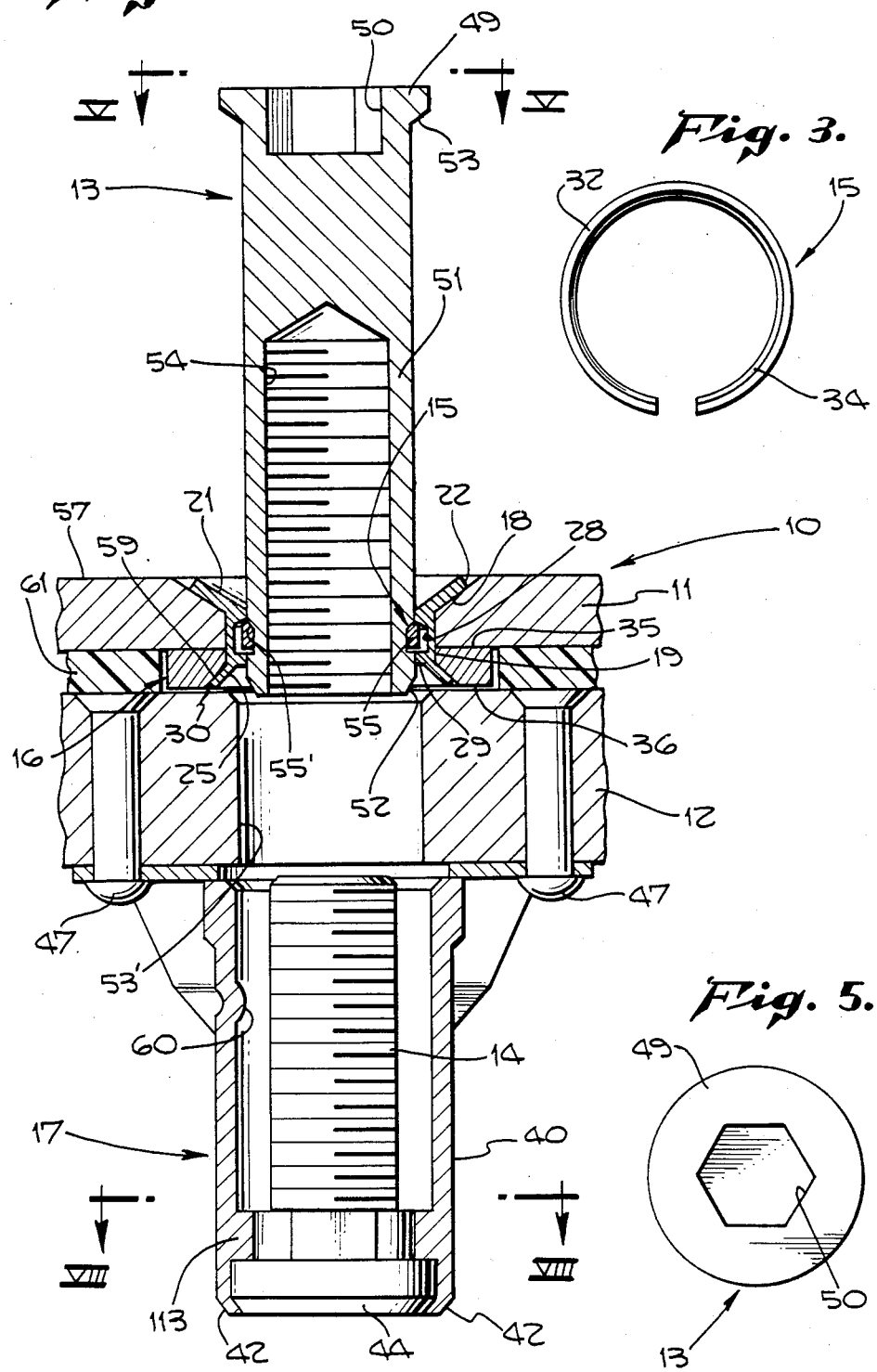

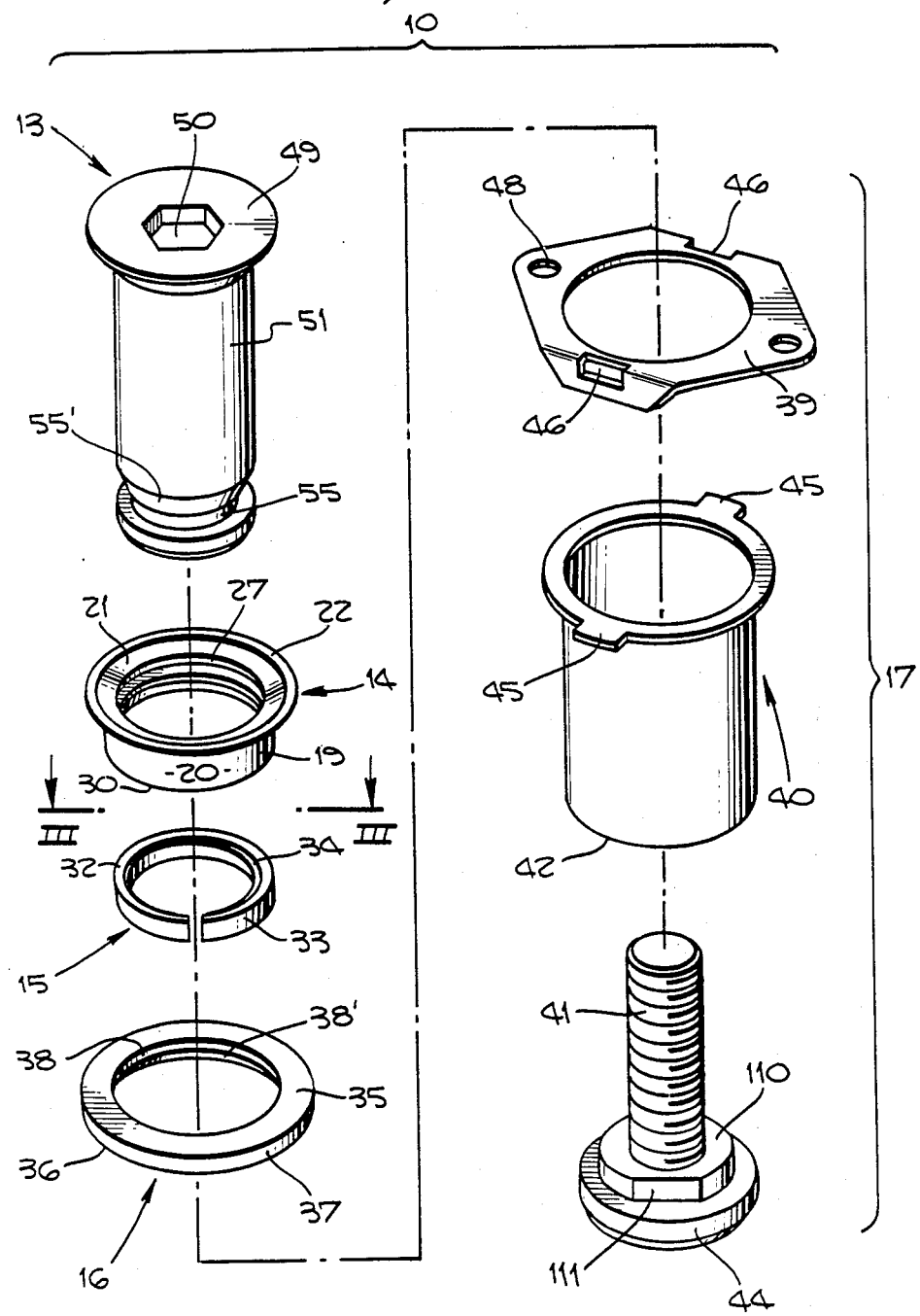

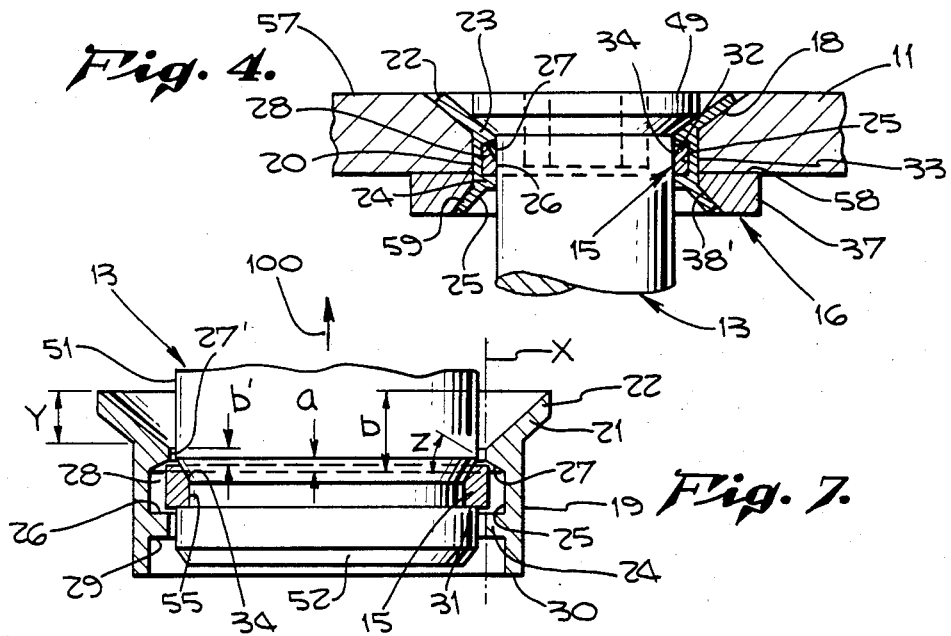
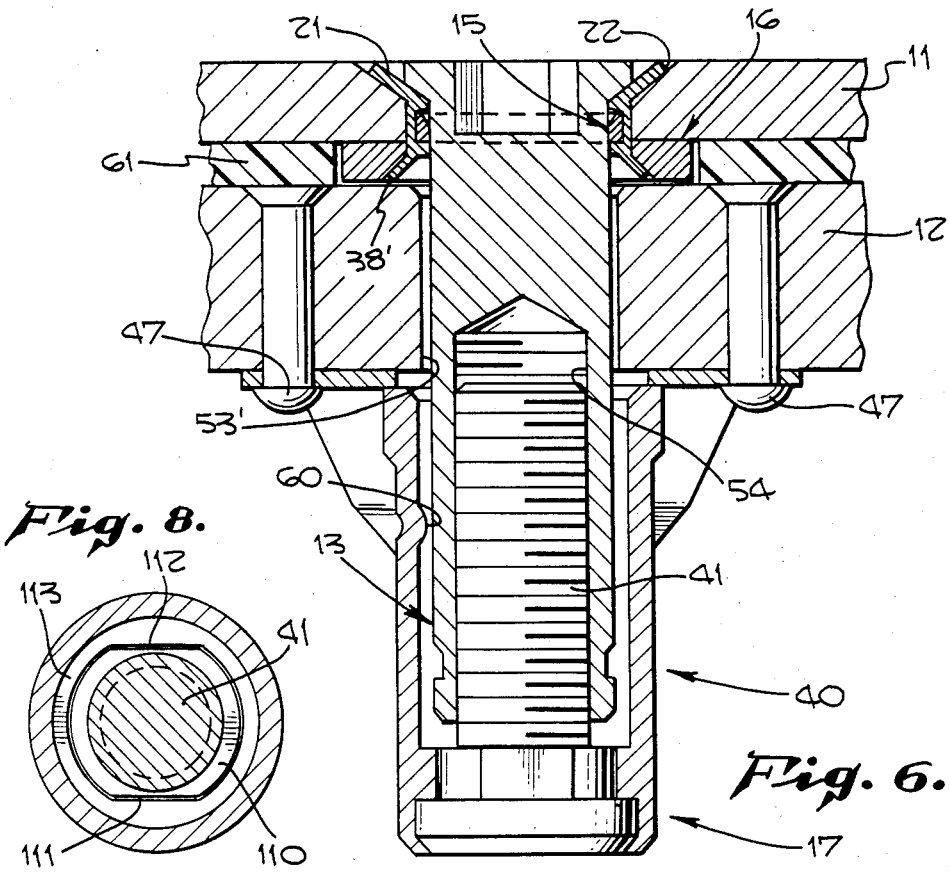

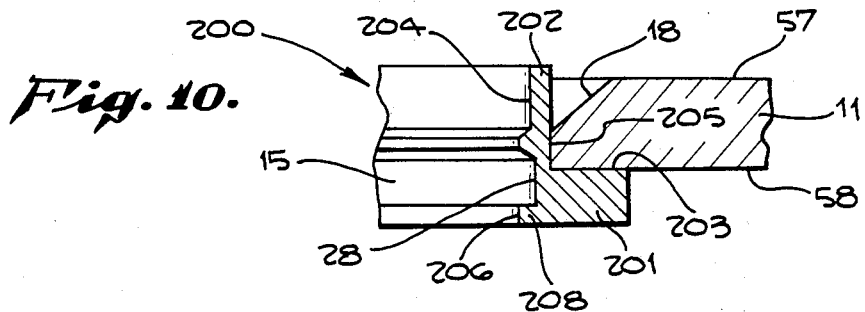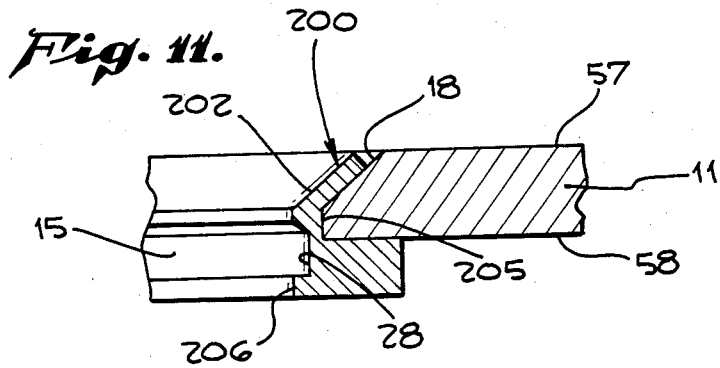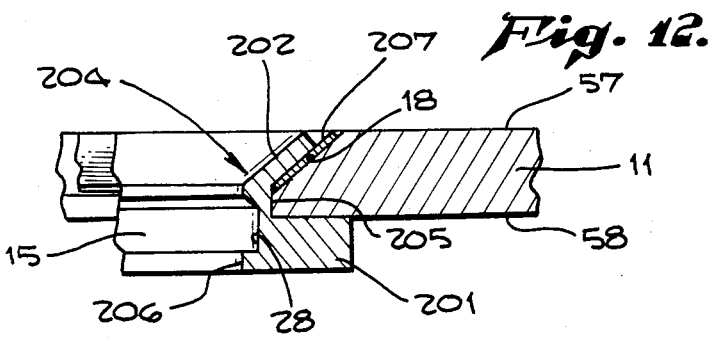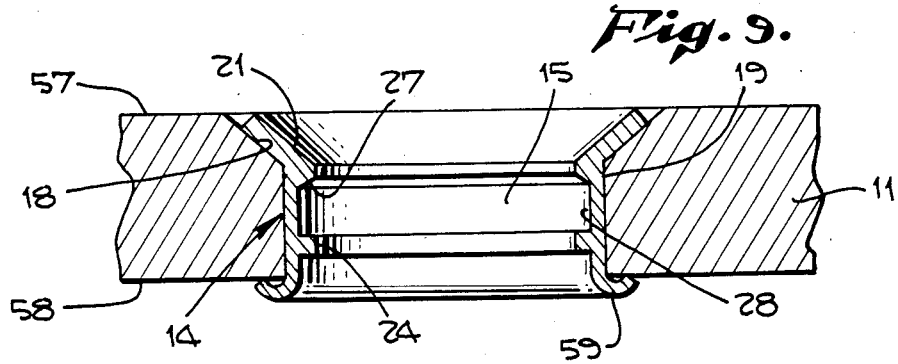

CAPTIVE PANEL FASTENER ASSEMBLY

BACKGROUND OF THE INVENTION

1. Field of the Invention

The invention relates to captive panel fastener assemblies; and, more particularly, to an improved captive panel fastener assembly for improved retention and locking of aircraft panels or the like.

2. Description of the Prior Art

Panel fasteners for aircraft are well known in the art. These fasteners secure the panel of an aircraft to a sub-panel by insertion through an opening in the panel with the fastener threadably engaging a receptacle assembly mounted on the sub-panel. The enlarged head of the fastener abuts against the panel on the access side and means known in the prior art are provided for preventing the fastener from becoming disengaged from the panel when the fastener is threaded out of engagement with the receptacle assembly.

One type of such panel fasteners include a stud assembly mounted to a sub-panel, under-structure or substructure through a basket, which assembly includes an axially extending male threaded stud held in place by a barrel mounted to the basket. The internal threads of the panel fastener engage the threads of the stud and clamp the the top panel and sub-panel together.

Various means have been suggested in the art to hold the panel fastener to the panel prior to engagement with the receptacle assembly. In certain applications, the panels may be made of composite materials and such materials may be easily cracked or delaminated if the load on the panel fastener assembly is not distributed over the area surrounding the hole.

In U.S. Pat. No. 4,285,380 to Gulistan, a panel fastener is disclosed having a stud nut with an internally threaded bore mounted to a grommet assembly installed in a panel. The nut is adapted to threadably engage a threaded nut mounted to a subpanel. In one position, the nut is held outwardly away from the panel by a retaining ring in the grommet assembly trapped in a groove adjacent the nose of the nut. When the nut is pushed inwardly of the panel, the retaining ring in the grommet assembly rides over the shank of the nut until it abuts against the nut head thereby holding the nut to the panel in an inward position until the nut is pulled away from the panel. The ring then rides along the nut shank until it re-enters the groove adjacent the nose of the nut.

Obviously, the grommet assembly of Glistan requires carefully machined parts and a relatively thick panel 16 for installation. Gulistan also requires a rather intricate hole to be formed in the panel for the grommet assembly.

In U.S. Pat. No. 4,324,517 to Dey, a panel fastener assembly is disclosed for joining a panel to a sub-panel. This assembly shows a nut having an internal thread fixed to a grommet assembly installed in the panel. A receptable assembly is attached to the sub panel. The grommet assembly has a retainer ring which engages a groove in the nut body when the nut is in the outwardly extended or withdrawn position and disengaged from the receptacle assembly. As can be seen in FIGS. 5 and 8 of Dey, carefully machined parts make up the panel fastener assembly. Further, as can be seen in FIG. 1 of Dey, a relatively thick panel 4 is required for installation of the grommet assembly.

Thus, in both Gulistan and Dey, parts are required which must be carefully machined and sub-assembled. The sub-assemblies require a relatively thick panel for installation and add weight to the installation. Certain panels, such as car door panels and the like, must be relatively thin and are light in weight. Thus, any fastener assemblies used in such panels must be very small and light weight. The installations of Gulistan and Dey are thick and heavy and add to the weight of the installation. This is highly undesirable, particularly in aircraft installations where it increases the payload of the aircraft. The grommets of both Dey and Gulistan do not provide a very large bearing surface where the bottom portions engage and bear against the panel. Further, panel thicknesses vary and it may be difficult to swage the grommets of Dey and Gulistan to hold the same in position in the panels. In addition, in both Dey and Gulistan, the grommets are installed by flaring the grommet on the exposed or access or exterior side of the panel. This assembly does not ensure an aerodynamically flush surface.

These type of fasteners are used on aircraft access doors and, in the prior art devices heretofore discussed, the grommets thereof must be swedged into the countersink on the exterior side of the door panel. Since door panel thicknesses vary, the grommet swedged portion may protrude either above the door panel or considerably lower than the door panel creating a potential aerodynamic problem. There is a need for a grommet head that ensures a consistent flushness on the exposed side of the door panel. That is, there is a need for a grommet assembly that tolerance resulting in varying thicknesses of door panels is taken up on the assembly itself. There is also a need for a grommet which has an internal cavity for the retaining ring of the bolt wherein the cavity is disposed between the access side and the blind side of the panel and thus not exposed so that it can be damaged which would affect the functioning thereof.

Further, as heretofore discussed, new aircraft designs use lightweight materials, such as composites. Doors of such material are easily damaged. Prior art devices must be swedged directly into the composite door resulting in possible damage to the door. There is a need for a grommet assembly that can be installed in an aircraft access door without damage thereto during such installation.

There is thus a need for a panel fastener assembly that can always be swaged uniformly against the panel in which the fastener is installed regardless of the thickness of the panel. Such an assembly should be able to secure a panel to a sub-panel where the bolt thereof may be held in a withdrawn or outward position without disengagement from the panel until it engages a receptacle assembly, on the subpanel. Such a fastener assembly should be lightweight, be easily manufactured and installed yet provide strength and rigidity to the installation.

In copending application Ser. No. 06/912,796, filed Sept. 26, 1986, now U.S. Pat. No. 4,735,536, issued Apr. 5, 1988, entitled "Captive Panel Fastener Assembly and Method For Installing the Same", John Duran, inventor, and commonly assigned, there is described a captive panel fastener assembly and method for installing the same wherein the fastener has a grommet with a cavity trapping a retaining ring therein, the cavity being generally rectangular in cross section Although it is highly unlikely, it is possible that repeated and intentional wiggling, twisting and bending of the bolt might result in the bolt coming out of the grommet. There thus is a need for a panel fastener wherein the bolt cannot come out of the grommet even if one wiggled, twisted and bent the bolt in the grommet.

SUMMARY OF THE INVENTION

It is an object of this invention to provide a simplified panel fastener assembly for securing a panel to a substructure while providing a wide surface of the assembly bearing against the blind side of the panel and having an improved grommet therein having a retaining ring holding the bolt of the fastener in a hold out position.

It is further an object of this invention to provide a panel fastener assembly having a bolt secured to a panel which can be held in a position away from the panel, then pushed to engage a receptacle assembly on a sub-structure, the bolt being secured to the panel by a grommet assembly having a cavity containing the retaining ring with a washer trapped between the grommet assembly and the blind side of the panel, the cavity being configured to allow the ring to tighten on the bolt groove when the bolt is pulled out from the panel.

It is still another object of this invention to provide a panel fastener assembly having a grommet assembly mounted in a panel providing strength and rigidity to the hole in the panel increasing the life of the panel and distributing the load over the area surrounding the hole, the grommet assembly cooperating with a bolt secured to the panel to hold the bolt in a position extending away from the panel and a washer on the blind side of the panel to secure the grommet assembly to the blind side of the panel with a relatively large bearing surface, the grommet having a cavity configured to prevent the bolt from coming out of the grommet.

It is still further an object of this invention to provide a panel fastener having a grommet with a preformed head at one end conforming to a countersunk hole on the access side of a panel and a terminal end swaged against the blind side of the panel, the grommet having an annular cavity therein between the access side and the blind side of the panel trapping a retaining ring therein, the ring being adapted to enter a groove in a bolt inserted into the grommet.

It is still further an object of this invention to provide a grommet having a head flared into a countersunk hole in the access side of a panel and a large bearing surface on the other side of the panel bearing against the blind side of the panel, the grommet having an annular cavity therein between the access side and the blind side of the panel trapping a retaining ring therein, the ring being adapted to enter a groove in a bolt inserted into the grommet.

These and other objects are preferably accomplished by providing a fastener assembly which includes a bolt, a grommet assembly which is attached to the panel and a receptacle assembly which is attached to the sub-structure. The bolt passes through the grommet assembly and engages the receptacle assembly thereby joining the panel and the sub-structure. The bolt includes an enlarged head and a threaded shank with a terminal nose and a groove adjacent the nose. A retainer ring is trapped in a cavity in the grommet assembly. The cavity has an annular peripheral vertical wall that the ring abuts against and the cavity is totally contained between the access side and the blind side of the panel. When the grommet assembly is installed in an aperture in the panel, which may be the skin of an aircraft panel, the bolt can be pushed between positions whereby, in a first position, the grommet assembly and retainer ring are at one end of the shank with the ring snap fitting into the groove thereby holding the head and shank outwardly from the aircraft panel and, in a second position, the retainer ring rides along the outer surface of the bolt and abuts against the head so that the remaining threaded shaft can extend through the aperture with a stud on the receptacle assembly threaded thereon securing the panel to the sub-structure. The cavity of the grommet assembly is an annular cavity defined by the inner annular peripheral vertical wall of the grommet assembly, an inwardly extending horizontal bottom flange, and, in a preferred embodiment, an upwardly and inwardly extending upper flange. The grommet assembly has a tapered head which may be preformed and which fits into a like countersunk hole in the panel. The other end thereof bears against the opposite side of the panel. In one embodiment, the thin walled end is swaged against a washer surrounding the grommet assembly and abutting against the opposite side of the panel thereby retaining the washer between the grommet assembly and the panel and bearing thereagainst. The washer provides a relatively large bearing surface for the panel fastener assembly. In another embodiment, the tapered head may be formed by flaring against the countersunk hole and the other end may have a large bearing surface bearing against the panel. In still another embodiment, the tapered head may be preformed and the terminal end swaged directly against the blind side of the panel. The bolt may be disengaged from the receptacle assembly and retracted away from the panel but retained thereto when the panel is disengaged from the sub-structure. The configuration of the cavity allows the retaining ring to bottom against the upper flange thereof when the bolt is pulled to the outward position causing the retaining ring to bottom out against the groove of the bolt. Thus, the more pull placed on the bolt, the tighter the retaining ring becomes on the bolt groove thereby preventing the bolt from coming out of the grommet assembly.

BRIEF DESCRIPTION OF THE DRAWING

FIG. 1 is a side elevation view partly in section showing a panel fastener assembly in accordance with the invention associated with a panel and a sub-structure;

FIG. 2 is an exploded view of the fastener assembly of FIG. 1 in accordance with the teachings of the invention;

FIG. 3 is a view taken along lines III—III of FIG. 2;

FIG. 4 is a view of the panel alone of FIG. 1 showing the grommet assembly installed therein;

FIG. 5 is a view taken along lines V—V of FIG. 2;

FIG. 6 is a view similar to FIG. 1 showing the bolt thereof threaded into the receptacle assembly;

FIG. 7 is a vertical view of the bolt of FIGS. 1 to 6 inserted into the grommet assembly and retaining ring of FIGS. 1 to 6 to illustrate a feature of the invention;

FIG. 8 is a view taken along lines VIII—VIII of FIG. 1.

FIG. 9 is a view, similar to FIG. 4, the bolt being omitted for of illustration, showing another embodiment of the invention;

FIG. 10 is a view similar to FIG. 9 showing still another embodiment of the invention, the grommet being in the unflared state;

FIG. 11 is a view of the assembly of FIG. 10 after flaring of the grommet; and

FIG. 12 is a view similar to FIG. 11 of a further embodiment of the invention.

DESCRIPTION OF THE PREFERRED EMBODIMENTS

Referring now to FIG. 1 of the drawing, a fastener assembly 10 is shown associated with a panel 11 and a sub-panel or substructure 12. Fastener assembly 10 includes a bolt 13 (see also FIG. 2), a grommet assembly 14 (see also FIG. 2), which includes a grommet 19 (FIG. 2) and a retaining ring 15 (see also FIGS. 2 and 3), a washer 16 (see also FIG. 2) and a receptacle assembly 17 (see also FIG. 2).

Grommet assembly 14 is shown installed in a countersunk opening 18 in panel 11 (see also FIG. 4). As seen in FIG. 2, grommet assembly 14 includes a grommet 19 having a generally cylindrical lower body portion 20 and, preferably, an integral upper outwardly flared portion 21. As particularly contemplated in the present invention, flared portion 21 may terminate at the top in a pointed lip 22 and portion 21 may extend a short distance into the interior of grommet 19. Portion 21 forms a point 27' (FIG. 7) with an inwardly and upwardly extending wall portion 27 integral with inner wall 25 and extending therefrom. Point 27' may be blunted having a width b'. A lower inner flange 24, preferably square in cross section, may be provided on the inner wall 25 of grommet 19 and preferably integral therewith. As seen in FIG. 7, flanges 24 and point 27' terminate inwardly toward the central longitudinal axis of grommet 19 along a line X lying in the same plane parallel to said axis. Also, the interior wall 25 of grommet 19 and the upper wall 26 of flange 24 and the sloped wall 27 form a cavity 28 which is preferably rectangular with a truncated top in cross section as shown FIG. 7. However, it is not necessary that the upper wall 27 be sloped and such wall may be horizontal as disclosed in copending application Ser. No. U.S. Pat. No. 4,735,536, issued Apr. 5, 1988 entitled "Captive Panel Fastener Assembly And Method For Installing The Same", John Duran inventor, and commonly assigned. Where applicable, the teachings therein are incorporated herein by reference.

Any suitable dimensions may be provided for grommet 19. For example, the angle across the diameter of tapered wall 21 may be about 100° with the thickness of lower portion 20 being about 0.006 to 0.01 inches thick. The overall height of grommet 19 may be about 0.117 to 0.127 inches in thickness. The spacing between the lower wall 29 of flange 24 and the terminal end 30 of grommet 19 may be about 0.028 to 0.032 inches, the width of cavity 28 at wall 25 being about 0.033 to 0.037 inches with the thickness of flange 24 being about 0.008 to 0.012 inches. The overall diameter of grommet 19 may be about 0.305 to 0.330 inches with the diameter of the inner point of pointed lip 22 being about 0.300 to 0.302 inches. The outer diameter of lower portion 20 may be about 0.248 to 0.250 inches with the smallest interior diameter of grommet 19 being about 0.204 to 0.206 inches. The extent of flange 24 into the interior of grommet 19 may be about 0.011 to 0.015 inches and the height of the portion Y of grommet 21 may be about 0.046 to 0.05 inches, the height may be about 0.0075 inches and the height b may be about 0.04 inches. The angle z may be about 30°.

Grommet assembly 14 also includes a retaining ring 15 (FIGS. 2 and 3) which ring may be of a circular split ring as seen in FIG. 3 having a flat bottom wall 31 (FIG. 7), a flat top wall 32 (FIG. 2) and a straight outer peripheral wall 33. Top wall 32 tapers inwardly and downwardly, at tapered wall 34, (see also FIG. 7) toward the central longitudinal axis of ring 15. Ring 15 is thus essentially rectangular in cross section with a truncated upper portion. At least the lower edges and the outer upper edge may be sharp. Any suitable dimensions may be used for ring 15. Thus, ring 15 may be about 0.210–0.212 inches in outer diameter before being split and about 0.188 to 0.190 inches in inner diameter before being split (about 0.188–0.192 inches after split) and about 0.028 to 0.032 inches in thickness. The taper of tapered wall 34 may be about 30° and the diameter of the inner edge of the upper tapered portion may be about 0.198 to 0.200 inches before split. The spacing of the split of ring 15 (FIG. 3) may be about 0.03 to 0.04 inches. Any suitable materials may be used, such as spring steel.

As will be discussed, fastener assembly 10 includes a washer 16 (FIG. 2) which is swaged against the panel 11 as will be discussed. Washer 16 is preferably circular and again of any suitable dimensions. Washer 16 may have a flat upper wall 35, a flat bottom wall 36 (see also FIG. 1) and an outer straight peripheral wall 37. Washer 16 has an inner wall 38 extending downwardly then tapering downwardly and outwardly, at tapered wall 38', away from the central longitudinal axis of washer 16. Washer 16 may be of stainless steel and may be about 0.370 to 0.375 inches in outer diameter and about 0.251 to 0.255 inches in inner diameter and about 0.045 inches in thickness.

Receptacle assembly 17 (FIG. 2) includes an apertured receptacle bracket or basket 39, an apertured barrel 40 and an externally threaded stud 41. As seen in FIG. 1, the lower end 42 of barrel 40 is crimped about the base 44 of stud 41 and is deflected inwardly to engage the stud and connect the barrel 40 thereto. As seen in FIG. 2, the stud 41 has a boss 110 with flattened areas 111, 112 (see also FIG. 8). As seen in FIG. 1, barrel 40 has an inwardly extending peripheral wall 113 configured similarly to boss 110 (FIG. 8). This is an antirotation feature preventing stud 41 from rotating within barrel 40 thereby allowing the stud 41 and barrel 40 to mate and lock and act as one unitary element. Barrel 40 also includes tabs 45 which are inserted in a pair of slots 46 formed in basket 39, thereby connecting the barrel 40 to the basket 39. Slots 46 are circumferentially greater in length than the width of the tabs 45 thereby permitting the barrel 40 and stud 41 to rotate to a limited degree with respect to basket 39. Basket 39 is secured to substructure 12 by any suitable means, such as by rivets 47 (FIG. 1) passing through apertures 48 (FIG. 2) in basket 39. Of course, any suitable receptacle assembly may be provided.

Bolt 13 is shown in FIG. 2 as being comprised of an enlarged head 49 having a countersunk hex 50 (see also FIG. 5) for receiving a suitable tool (not shown) therein. Bolt 13 includes a generally cylindrical main body portion 51 (FIG. 2) extending from head 49 and terminating at a blunt nose portion 52 (FIG. 1). The underside of head 49 may be tapered as at tapered portion 53 and the interior of body portion 51 is threaded as at threaded section 54. An annular groove 55 is provided on body portion 51 adjacent nose portion 52 with a tapered portion 55' providing a ramp leading away from groove 55 to body portion 51.

Bolt 13 may be of any suitable materials, such as stainless steel, and may be of any suitable dimensions.

For example, with the dimensions heretofore given, the taper of tapered portion 53 may be about 100° with the outer diameter of head 49 being about 0.278 inches and the overall thickness thereof about 0.042 inches. The outer diameter of body portion 51 may be about 0.201 to 0.202 inches and the inner diameter thereof about 0.164 inches (the outer diameter of stud 41 being of course related to this inner diameter to threadably engage the same). The thickness or width of nose portion 52 may be about 0.045 inches and the inner diameter thereof, which may be unthreaded, may be about 0.168 inches.

Bolt 13 is shown in FIG. 1 in its disengaged and withdrawn position with respect to panel 11. As seen in FIG. 4, grommet assembly 14 is shown installed in panel 11. The tapered head 21 conforms to the tapered countersunk opening 18 in the outer access surface 57 of panel 11. Ring 15 is disposed within cavity 28, its resiliency and split providing easy assembly therein, the outer surface 33 abutting against the inner surface 25 of cavity 28 and retained therein between flanges 23, 24.

Head 49 of bolt 13 is shown as abutting against the tapered head 21 (FIG. 4) of grommet 19, ring 15 having ridden out of groove 55, up ramp 55' and along the smooth outer surface of bolt portion 51 when bolt 13 was pushed from the FIG. 1 to the FIG. 4 position. As seen in FIG. 4, washer 16 surrounds bolt portion 51 and abuts against the outer surface or blind side 58 of panel 11 and trapped therein by swaging of the relatively thin walled lower portion 59 of grommet 19 a seen in FIG. 4. When bolt 13 is moved from the FIG. 4 back to the FIG. 1 position, split retaining ring 15 ride along the outer surface of bolt body portion 51 until i moves down ramp 55' and snaps into the groove 55 (FIG. 1) thus retaining bolt 13 in a hold-out position with resect to panel 11. Sub-structure 12 could of course be moved away from panel 11 in the FIG. 1 position if desired. Thus, ring 15 bears compressively in radial compression against the outside surface of body portion 51 when not in groove 55. This positive force tends to orient the bolt 13 and camming of bolt 13 with respect to rig 15 is possible with a positive side load to obtain an off axis orientation. Ring 15 also keeps bolt .3 in any desired longitudinal position because the compressive force applied to bolt 13 by ring 15 establishes a friction force between bolt 13 and ring 5 that resists displacement of bolt 13. In order to maintain this axial alignment when ring 15 is out f groove 55, the inner surface thereof and the outer surface of bolt 13 are right cylindrical. The nose 52 is rounded as shown in FIG. 1 for guidance of bolt 13 into the receptacle assembly 17.

As seen in FIG. 7, when bolt 13 is pulled in the direction of arrow 100, to the outward position (the panel 11 being omitted for convenience f illustration), the retaining ring 15 bottoms out against the sloping wall 27 causing ring 15 to bottom out against the groove 55 of bolt 13. Thus, the more one pulls on bolt 13 in the direction of arrow 100, the tighter the retaining ring 15 becomes on groove 55. This wedging effect prevents the bolt 13 from coming out of grommet 19.

The resiliency of ring 15 allows it to snap into groove 55 and the terminal end 52 of bolt 13 is essentially flush with the terminal end 30 of grommet 19 and washer 16.

Thus, by pushing bolt 13 from FIG. 1 to the FIG. 4 position toward stud 41, the split retainer ring 15 expands over the outer surface of bolt portion 51 allowing axial movement of bolt 13 toward stud 41. Rotation of bolt 13 causes it to threadably engage stud 41 of receptacle assembly 17 as seen in FIG. 6. Preferably, bolt 13 and stud 41 have double lead threads in order to decrease the time and motion required to remove and reinstall the panel 11.

Barrel 40 may include inwardly facing protrusions 60 (FIG. 1) which frictionally engage the exterior outer surface of body portion 51 of bolt 13 when it is threadably engaged on stud 41 as seen in FIG. 6, thereby securely locking the sleeve bolt 13 to receptacle assembly 17 when panel 11 is secured in opening 53' in subpanel 12. Preferably, protrusions 60 are produced by deforming the exterior of barrel 40 but any suitable friction lock between the inner surface of barrel 40 and the external surface of bolt portion 51 may be provided, such as a plastic insert installed through the side of barrel 40 or protrusions on the threads of the bolt.

Although grommet 19 may fit flush against the inner surface of panel 11, in some instances, the thickness of panel 11 and sealing requirements may call for the use of a gasket 61 (FIGS. 1 and 6) between panel 11 and subpanel 12.

Ring 15 is preferably split or slit to permit elastic expansion and contraction over a comparatively large diametral difference between a relaxed position in groove 55 and an expanded position on the body portion 51 of bolt 13.

The use of the washer 16 is particularly effective in the panel fastener assembly 10 when used with composite materials. The washer 16 has a wider surface 35 that bears against the surface 58 of panel 11 than prior art assemblies. Since the washer 16 is always the same thickness, swaging of end 59 of grommet 19 quickly and easily forms a lip bearing against washer 16 and holding it to panel 11 regardless of the thickness of panel 11. There can be no distortion or jamming up or pinching of the retaining ring 15 since the swaging is carried out exteriorly of grommet 19. This is carried out in a manner not requiring carefully milled parts. The unique configuration of the cavity 28 in grommet 19 prevents the bolt 13 from coming out of grommet 19 even if the bolt 13 is intentionally twisted, bent or wiggled in the grommet 19. A wedging action takes place which prevents such separation.

The grommet 19 has heretofore been disclosed as having an upper preformed tapered portion 21, with the lower thin walled end 59 swaged against washer 16. However, as seen in FIG. 9, wherein like numerals refer to like parts of the embodiment of FIGS. 1 to 8, the lower thin walled end 59 may be swaged directly against the blind side 58 of panel 11 thereby eliminating the need for washer 16. Although this arrangement may not be as effective for panels of composite materials, it is effective for panels of other materials, such as aluminum. The tapered portion 21 is preformed to fit snugly into countersunk opening 1 and, thus, no swaging is necessary on the exposed exterior access side of the panel 11. Thus, since tapered portion 21 of grommet 19 is preformed on the exposed or outer access surface 57 of panel 11, an aerodynamically flush surface is provided.

In the embodiments of FIGS. 1 to 9, cavity 28 of grommet 19 is located within the countersunk opening 18 through panel 11 between the access or outer exterior side 57 and the inner or blind side 58. Thus, the cavity 28 is totally contained inside panel 11 and is not exposed where it could possibly be damaged which might prevent the retaining ring 15 from functionally correctly. Of course, tapered wall 27 of grommet 19 in FIG. 9 may be horizontally extending as described and claimed in copending U.S. Pat. No. 4,735,536, issued Apr. 5, 1988 as heretofore discussed. This also applies to the embodiments of FIGS. 10 to 12 as will now be discussed.

Referring now to FIGS. 10 and 11 wherein like numerals refer to like elements of the embodiment of FIGS. 1 to 8, a grommet assembly 200 is shown in FIG. 10 as having an integral flange 201 at its lower end and a thin walled generally cylindrical portion 202 at its upper end. Flange 201 is preferably relatively thick and wider in outer diameter than the inner and outer diameter of portion 202 after flaring as will be discussed. Flange 201 preferably has a flat surface 203 adapted to abut against the inner or blind side 58 of panel 11 when grommet 204 is inserted into the hole 205 in panel 11 from the blind or inner side 58 thereof. Grommet 204 has a cavity 28 otherwise identical to cavity 28 of the embodiment of FIGS. 1 to 9 with similar upper and lower walls as shown thereby retaining ring 15 therein. Flange 206 is similar to bottom flange 24 of grommet 19 but lower thin walled portion 59 is eliminated. As seen in FIG. 11, after insertion into hole 205 as heretofore discussed, cylindrical portion 202 is flared against the countersunk opening 18. Thus, a relatively large bearing surface is provided on the blind or inner side of panel 11, which may be of a composite material, without need of a separate washer. However, if it was desired to use a washer or some similar element, as seen in FIG. 12, wherein like numerals refer to like parts of the embodiment of FIGS. 10 and 11, a truncated conically shaped shim 207, which may be metallic or of any other suitable material, such as plastic, conforming to countersunk opening 18, may be placed therein prior to swaging of portion 202 thereby swaging grommet 204 against shim 207 as seen in FIG. 12.

Thus, it can be seen that grommets 19 and 204 may be installed in a panel with or without a washer on the bottom or underside of the panel 11.

Although the invention is described herein with respect to a particular embodiment, the scope thereof is not limited to the foregoing description but is to be determined by the appended claims.

We claim:

1. A captive panel fastener assembly comprising:
   a bolt having an enlarged head at one end tapered on its underside, a nose at the other end having a tapered portion tapering downwardly and inwardly toward the center axis of said bolt, and an intermediate body portion with a groove provided on the bolt between the nose and the body portion:
   a panel having an exterior side and an interior side with a countersunk opening on said exterior side leading into a hole extending therethrough, said countersunk being a tapered cavity in said panel on the exterior side thereof with said hole being a generally cylindrical aperture through said panel leading from said tapered cavity to the interior side of said panel, the tapered underside of said bolt head conforming to said tapered cavity with said tapered underside being adapted to engage said tapered cavity presenting a flush upper surface on the exterior of said panel;
   a grommet assembly mounted in said hole, the grommet assembly including a grommet having a pre-formed outwardly flared portion at one end disposed entirely in said tapered cavity of said countersunk and conforming thereto and a generally cylindrical portion integral with and extending from said pre-formed flared portion disposed in said generally cylindrical aperture and conforming thereto, and a terminal end on the interior side of said panel integral with and extending from said cylindrical portion retaining said grommet against the interior side of said panel, said grommet including an annular cavity, said annular cavity being generally rectangular in cross section defined by a generally flat vertical peripheral inside wall, a lower wall extending generally normal to said inside wall, and an upper wall sloping inwardly and upwardly toward the center axis of said grommet; and
   an annular retaining ring having an outer diameter substantially less than its overall height with a central opening therein mounted in said annular cavity, said ring having a first upper wall portion tapering downwardly and inwardly toward the center axis of said ring and thus conforming to the taper of said nose, and a second upper wall portion tapering downwardly and outwardly away from the center axis of said ring and thus conforming to the slope of said cavity, said bolt extending through said grommet and through the opening in said ring, said ring encircling said bolt between the head and nose thereof and being adapted to ride along the body portion of said bolt and snap into said groove thereby retaining the bolt in a first position held out from the exterior side of said panel and retaining said bolt in a second position wherein said bolt is adapted to engage a receptacle assembly mounted in an adjacent sub-panel, the retaining ring being adapted to move along the body of said bolt toward said head when said bolt is inserted into said grommet assembly, then back along the body of said bolt and into the groove of said bolt when said bolt is moved to said first position.

2. In the assembly of claim 1 wherein said terminal end is an integral flange member having an outer diameter substantially greater than the inner diameter of said grommet and having a flat surface bearing against the interior side of the panel thereby retaining the grommet to the panel.

3. In the assembly of claim 1 including a truncated conically shaped shim conforming to said counter-sunk opening and disposed therein between said flared portion and said counter-sunk opening.

4. In the assembly of claim 1 wherein said cavity is disposed internally of said hole between said exterior and interior sides of said panel.

5. In the assembly of claim wherein said terminal end is swaged against the interior side of said panel.

6. In the assembly of claim 1 including an annular washer encircling said grommet, the washer having a substantially flat surface bearing against the interior side of said panel, the terminal end of said grommet being swaged against said washer.

7. In a captive panel fastener assembly comprising a bolt having an enlarged head at one end, a tapered nose at the other end, and an intermediate body portion, a groove provided on the bolt between the nose and the body portion, a panel having a hole extending therethrough with a grommet assembly mounted therein for retaining the bolt in a first position held out from the access side of said panel and for retaining said bolt in a second position wherein said bolt is adapted to engage a receptacle assembly mounted in an adjacent sub-panel, the grommet assembly including an annular cavity therein having a retaining ring mounted in the cavity along the body of said bolt toward said head when said bolt is inserted into said grommet assembly, back along the body of said bolt and into the groove of said bolt when said bolt is moved to said first position, an annular washer encircling said grommet assembly on the blind side of said panel, said washer abutting against the blind side of said panel, said grommet assembly including a grommet having a terminal end on the blind side of said panel bearing against said washer thereby holding said washer against the blind side of said panel and bearing thereagainst, the improvement which comprises said cavity being generally rectangular in cross section having a generally flat vertical peripheral inside wall, a lower wall extending generally normal to said inside wall, and an upper wall sloping inwardly and upwardly toward the central longitudinal axis of said grommet assembly, said ring being substantially less in outer diameter than its overall height, said ring being a split metallic ring having an outer generally flat vertical wall adapted to bear against the inside wall of said cavity when to disposed in said groove, said ring having a generally flat bottom wall bearing against said lower wall of said cavity and a generally flat top wall bearing against said upper wall of said cavity, said ring also including a tapered wall leading form said top wall of said ring downwardly and inwardly toward the central axis thereof and conforming to the tapered nose of said bolt allowing quick and easy installation thereon.

8. In the assembly of claim 7 where the upper end of said grommet assembly extends in a direction outwardly and upwardly from the central longitudinal axis of said grommet assembly meeting said upper wall interiorly of said grommet assembly to form a point.

9. In the assembly of claim 8 wherein said point is blunt.

10. In the assembly of claim 6 wherein said point and the inward extent of said lower wall terminate at a point lying in substantially the same vertical plane extending generally parallel to the central longitudinal axis of said grommet assembly.

11. In the assembly of claim 10 wherein said terminal end includes a cylindrical thin-walled portion on said grommet swaged against said washer.

12. In the assembly of claim 7 wherein said washer has a flat face on the side thereof bearing against the blind side of said panel.

13. In the assembly of claim 11 wherein said washer has a flat face with a tapered face leading from said second mentioned flat face inwardly toward the central axis of said washer on the opposite side of said first mentioned flat face.

14. In the assembly of claim 13 wherein said terminal end bears against said tapered face.

15. In the assembly of claim 14 wherein the outer diameter of said washer is between about 0.370 to 0.375 inches and the inner diameter of said washer is between about 0.251 to 0.255 inches.

16. In the assembly of claim 15 wherein said washer is about 0.045 inches in thickness.

17. In the assembly of claim 7 including frictional means associated with said receptacle assembly and said bolt for preventing relative rotation therebetween.

18. In the assembly of claim 7 wherein said grommet has a main central generally cylindrical body portion with an integral lower thin-walled portion providing the terminal end thereof, said lower wall being formed by a first inwardly extending generally horizontal flange separating said body portions and said upper wall being formed by a second inwardly extending generally triangularly-shaped flange spaced from said first flange having a lower upwardly and inwardly sloping wall flange, the terminal inwardly extending ends of both of said flanges terminating in vertical walls lying in substantially the same vertical plane, said second flange having its upper wall flaring outwardly and upwardly beyond the plane of the outer surface of said cylindrical body portion, the spacing between the first flange and the lower wall of said second flange and the inner wall of said cylindrical body portion forming said cavity.

19. In the assembly of claim 7 wherein said receptacle assembly includes a basket secured to said sub-panel, a barrel secured to said basket, and a stud extending through said barrel toward said bolt and engagable therewith thereby being adapted to secure said bolt releasably to said stud, said barrel being retained to said stud and anti-rotation means associated with both said stud and said barrel for preventing relative rotation therebetween.

20. In the assembly of claim 7 wherein said receptacle assembly includes a stud threadably engagable with said bolt and friction means associated with said bolt and said stud for preventing relative movement therebetween by providing a lock between said bolt and said stud when said bolt is threaded to said stud.

21. In a panel fastener assembly comprising a bolt having an enlarged head at one end, a tapered nose at the other end and an intermediate body portion, a groove provided on the bolt between the nose and the body portion, a grommet assembly encircling the bolt between said head and nose, said grommet assembly including a grommet having an annular cavity therein with a retaining ring mounted in the cavity, an annular washer encircling the terminal end of said grommet below said cavity, the improvement which comprises:

said cavity being generally rectangular in cross section having a generally flat vertical peripheral inside wall, a lower wall extending generally normal to said inside wall, and an upper wall sloping inwardly and upwardly toward the central longitudinal axis of said grommet assembly, said retaining ring having a first upper wall portion tapering downwardly and outwardly away from the center axis thereof conforming to said sloping upper wall of said cavity, and a second upper wall portion tapering downwardly and inwardly toward the center axis of said ring conforming to the taper of the nose of said bolt thus providing quick and easy assembly and a wedging action between the ring and cavity sloping wall.

22. In the assembly of claim 21 wherein said grommet has a main central generally cylindrical body portion with an integral lower thin-walled portion providing the terminal end thereof, said lower wall being formed by a first inwardly extending generally horizontal flange separating said body portions and said upper wall being formed by a a second inwardly extending generally triangularly-shaped flange spaced from said first flange and having a lower upwardly and inwardly sloping wall, the terminal inwardly extending ends of both of said flanges terminating in vertical walls lying in substantially the same vertical plane, said second flange having an upper wall flaring outwardly and upwardly beyond the plane of the outer surface of said cylindrical body portion, the spacing between the first flange and the sloping wall of said second flange and the inner wall of said cylindrical body portion forming said cavity.

23. In the assembly of claim 21 wherein said washer has a flat face on the side thereof facing said cavity.

24. In the assembly of claim 23 wherein said washer has a flat face with a tapered face leading from said second mentioned flat face inwardly toward the central axis of said washer on the opposite side of said first mentioned flat face.

25. In the assembly of claim 24 wherein the outer diameter of said washer is between about 0.370 to 0.375 inches and the inner diameter of said washer is between about 0.251 to 0.255 inches.

26. In the assembly of claim 25 wherein said washer is about 0.045 inches in thickness.

* * * * *